(12) United States Patent
DiMarco et al.

(10) Patent No.: US 9,559,566 B2
(45) Date of Patent: Jan. 31, 2017

(54) COUPLED CAPACITIVE AND MAGNETIC SERVO MOTOR SYSTEMS

(71) Applicant: Tolomatic, Inc., Hamel, MN (US)

(72) Inventors: Steven DiMarco, Chanhassen, MN (US); Steven Besser, Montrose, MN (US); Gary W. Rosengren, Brooklyn Park, MN (US)

(73) Assignee: Tolomatic, Inc., Hamel, MN (US)

( * ) Notice: Subject to any disclaimer, the term of this patent is extended or adjusted under 35 U.S.C. 154(b) by 0 days.

(21) Appl. No.: 14/738,383

(22) Filed: Jun. 12, 2015

(65) Prior Publication Data

US 2015/0365022 A1 Dec. 17, 2015

Related U.S. Application Data

(60) Provisional application No. 62/011,923, filed on Jun. 13, 2014, provisional application No. 62/060,973, filed on Oct. 7, 2014.

(51) Int. Cl.
*H01L 41/04* (2006.01)
*H02K 7/108* (2006.01)
*H02N 1/00* (2006.01)
*H02K 7/00* (2006.01)

(52) U.S. Cl.
CPC ............... *H02K 7/108* (2013.01); *H02K 7/00* (2013.01); *H02N 1/004* (2013.01)

(58) Field of Classification Search
CPC ................ H02P 5/00; H02P 4/00; H02P 5/52; H02P 23/0004; H02P 9/00; H02K 7/108; E05F 15/41
See application file for complete search history.

(56) References Cited

U.S. PATENT DOCUMENTS

| 3,586,221 | A | 6/1971 | Rosen |
| 4,019,106 | A | 4/1977 | Van Doren |
| 7,141,752 | B2 | 11/2006 | Hochhalter et al. |
| 7,416,510 | B2 | 8/2008 | Gebby |
| 7,939,979 | B2 | 5/2011 | Hochhalter et al. |
| 8,701,513 | B2 | 4/2014 | Rosengren et al. |
| 8,736,137 | B2 | 5/2014 | Ludois et al. |
| 2003/0064858 | A1 | 4/2003 | Saeki et al. |
| 2006/0112781 | A1 | 6/2006 | Kuras et al. |

(Continued)

OTHER PUBLICATIONS

Ludois, Daniel C. et al. "Capacitive Power Transfer for Rotor Field Current in Synchronous Machines." IEEE Transactions on Power Electronics, vol. 27, No. 11, Nov. 2012, pp. 4638-4645.

(Continued)

*Primary Examiner* — Karen Masih
(74) *Attorney, Agent, or Firm* — Dorsey & Whitney LLP

(57) ABSTRACT

A motor system comprises a rotor shaft, and a magnetic drive motor and a capacitive drive motor. An engagement system is configured for selectively engaging one or both of the magnetic drive motor and the capacitive drive motor with the rotor shaft, in order to rotate the rotor shaft at a desired rotational speed and generate a desired output torque. An actuator may be coupled to the rotor shaft in order to convert the rotational speed and/or output torque (or a rotational position of the rotor shaft) for operation on a load, for example to position the load rotationally or linearly with respect to the rotor axis, or to exert a force or torque on the load.

27 Claims, 13 Drawing Sheets

(56) References Cited

U.S. PATENT DOCUMENTS

| | | |
|---|---|---|
| 2009/0080130 A1 | 3/2009 | Hein |
| 2009/0261671 A1 | 10/2009 | Hochhalter et al. |
| 2011/0089877 A1 | 4/2011 | Blanding et al. |
| 2013/0043762 A1 | 2/2013 | Ludois et al. |
| 2013/0106317 A1 | 5/2013 | Ludois |
| 2014/0175941 A1* | 6/2014 | Johnson .................. H02N 1/006 310/309 |

OTHER PUBLICATIONS

Ludois, Daniel C. et al. "Aerodynamic Fluid Bearings for Translational and Rotating Capacitors in Noncontact Capacitive Power Transfer Systems." IEEE Transactions on Industry Applications, vol. 50, No. 2, Mar./Apr. 2014, pp. 1025-1033.
The International Search Report and Written Opinion dated Oct. 5, 2015 in connection with International Application No. PCT/US2015/035608.

* cited by examiner

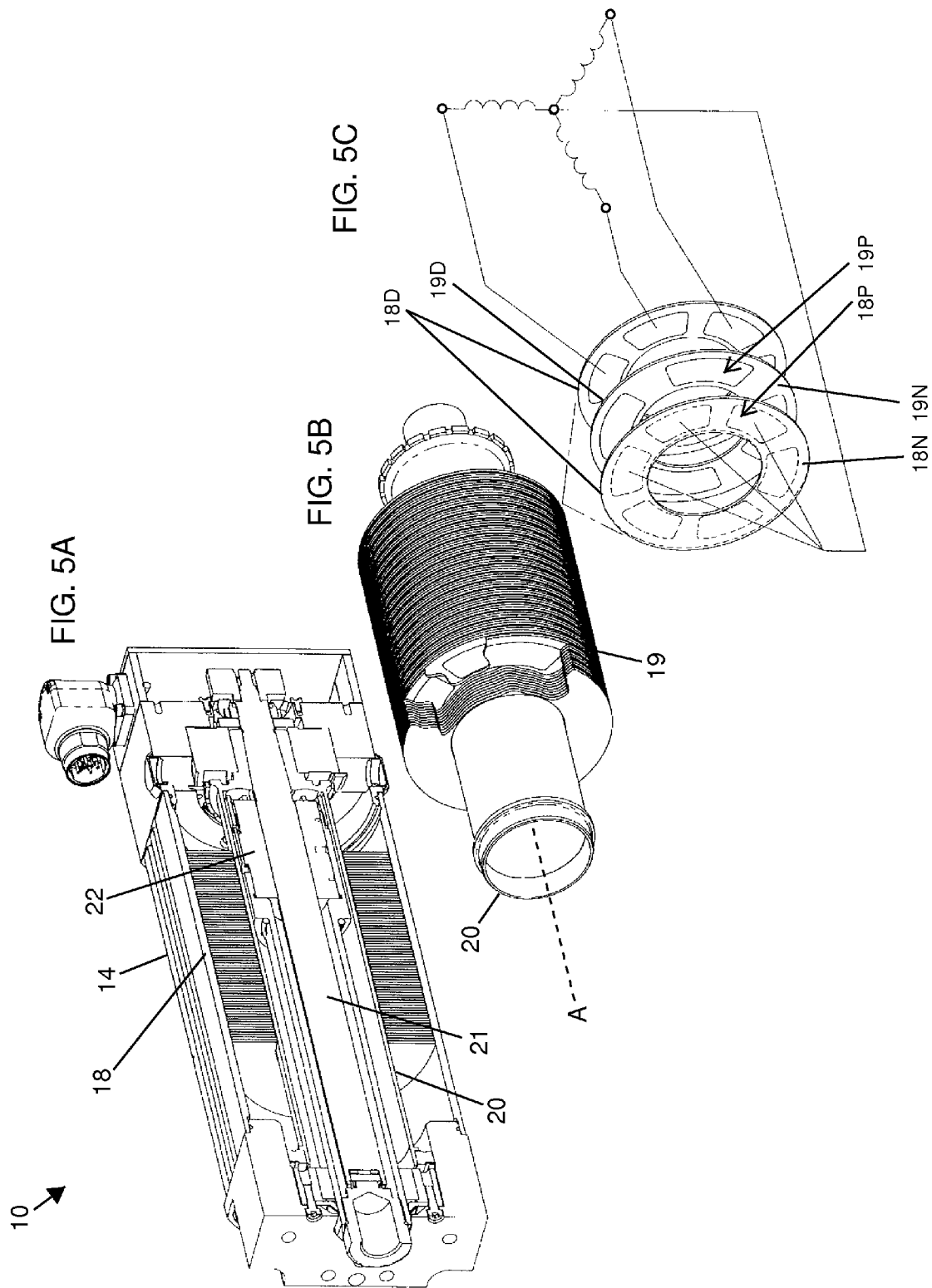

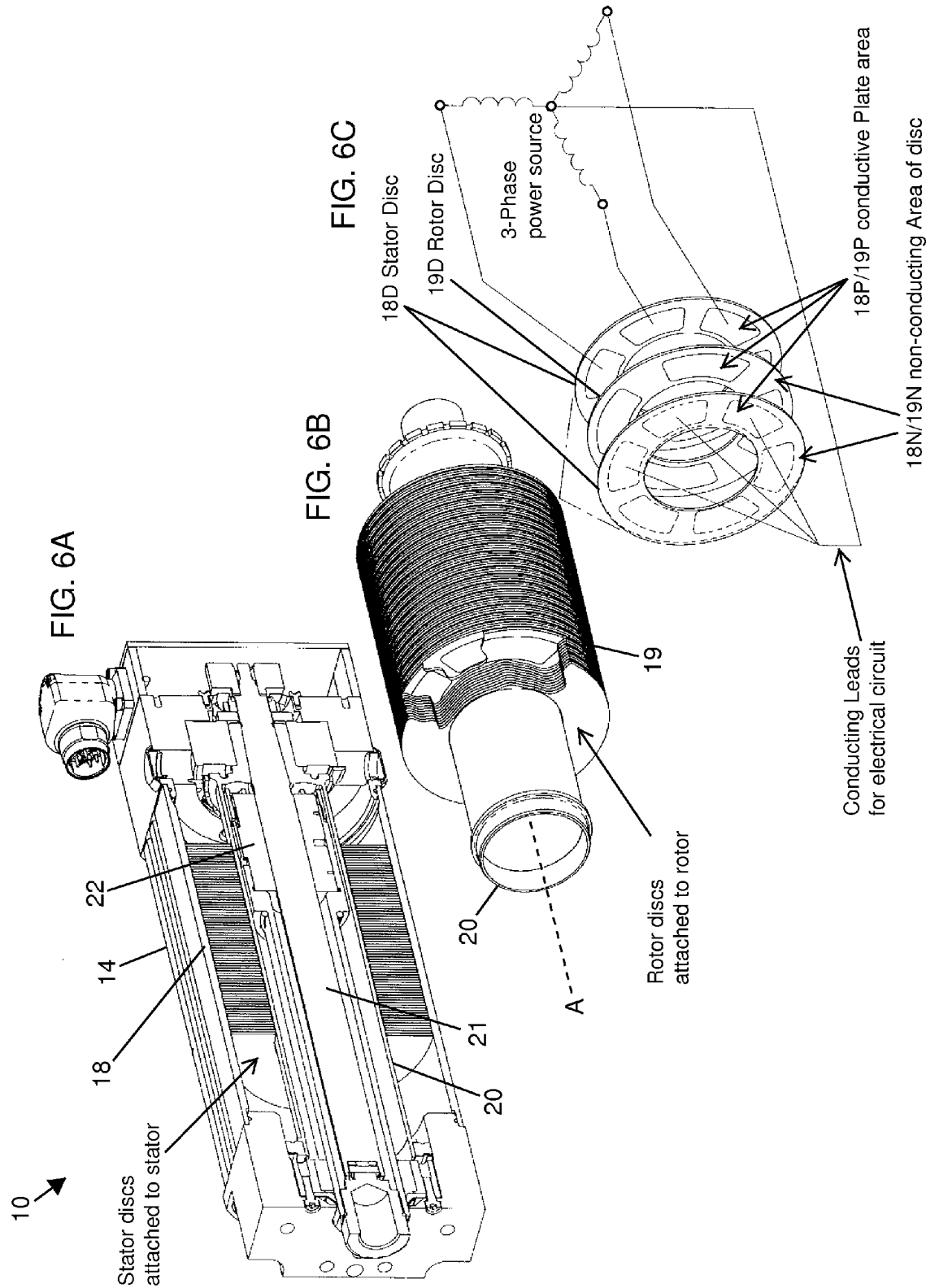

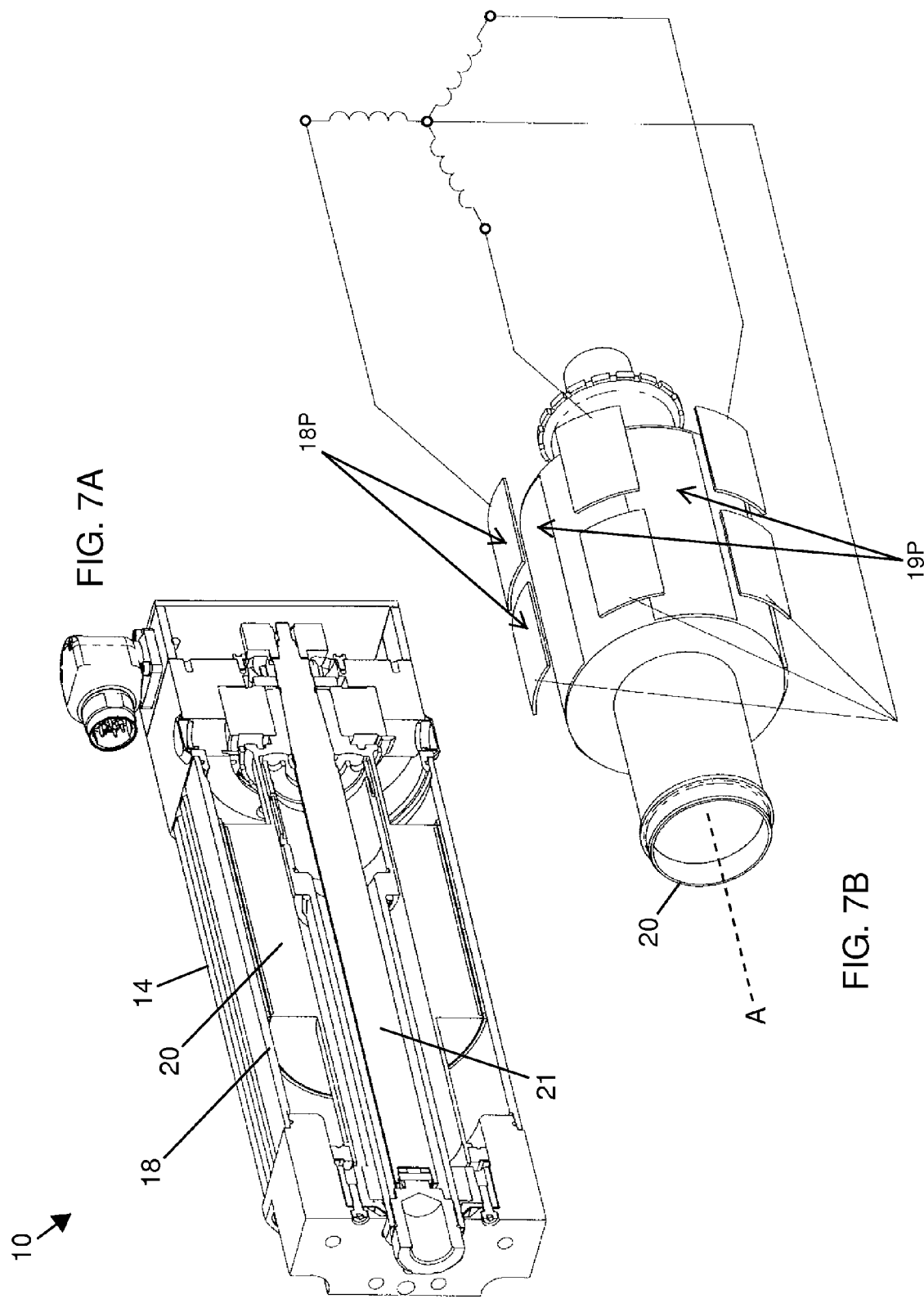

COUPLED CAPACITIVE AND MAGNETIC SERVO MOTOR SYSTEMS

CROSS-REFERENCE TO RELATED APPLICATIONS

This application claims priority to U.S. Provisional Patent Application No. 62/011,923, filed Jun. 13, 2014, entitled "Linear Actuator with Capacitively Coupled Rotor," and U.S. Provisional Patent Application No. 62/060,973, filed Oct. 7, 2014, entitled "Coupled Capacitive and Magnetic Servo Motor Systems", each of which is incorporated by reference herein, in the entirety and for all purposes.

BACKGROUND

This application relates generally to electrically powered motor systems and actuators, including electromechanical actuators and motors adapted for robotics and other automated actuator systems. Suitable applications include, but are not limited to, welding and automated tooling systems utilized in the automotive, transportation and manufacturing industries, including robotic, pedestal and fixture welding guns. Additional applications include, but are not limited to, motor systems, short stroke actuators and other linear actuator systems for injection molding, clamping fixtures, parts manufacturing, and precision control of linear positioning systems utilized in automated production, packaging and materials processing.

Various industries, and particularly the manufacturing industry, among others, have utilized linear actuators to control the movements of automated welding guns, automated clamping fixtures, and the like. Specifically, in the automotive industry and various other industries, actuation and control of welding guns and clamping fixtures and controlled linear movement of other fixtures and devices have been accomplished using fluid actuators such as pneumatic or hydraulic actuators. While fluid actuators have functioned reasonably well for these purposes, they inherently embody various limitations. One, because of the possibility of leaks and failure of seals, etc., there is always the concern of contamination of the worksite by a leaking fluid. Second, fluid actuators necessarily require a source of pressurized fluid and thus a fluid supply system. This leads to significant maintenance and other costs. Third, limitations sometimes exist with respect to the accuracy and positioning of linear movement and the adjustability of such movement.

Accordingly, there is a need in the art for an improved actuator which overcomes the deficiencies and limitations of the prior art, and in particular, an improved actuator which is designed for use in controlling the movement of, and accommodating the loads associated with, welding guns, clamping fixtures, injection molding fixtures, and various other fixtures and devices. A need also exists for an improved actuator which is particularly useful for applications requiring a relatively short linear stroke actuation and highly accurate positioning.

Suitable motor coupling arrangements include, but are not limited to, those described in U.S. Pat. No. 8,736,137 and U.S. Publication No. 2013/0106317, each of which is incorporated by reference herein, in the entirety and for all purposes. Suitable alternate coupling designs include, but are not limited to, those described in U.S. Pat. No. 3,386,307, U.S. Pat. No. 5,154,091, U.S. Pat. No. 5,491,372, U.S. Pat. No. 5,557,154 and U.S. Pat. No. 6,469,272, each of which is incorporated by reference herein, in the entirety and for all purposes.

Suitable electric actuator systems adaptable to be operated with a capacitively coupled rotor system as disclosed herein include those described in U.S. Pat. No. 7,141,752 to Hochhalter et al., entitled "Electric Actuator," U.S. Pat. No. 7,939,979 to Hochhalter et al., entitled "Electric Actuator," and U.S. Pat. No. 8,701,513 to Rosengren et al., entitled "Screw Driven Linear Actuator and Housing Assembly," each of which is incorporated by reference herein, in the entirety and for all purposes.

SUMMARY

This application is directed to coupled capacitive and magnetic servo motor systems. The disclosed systems may be used as a coupled magnetic/capacitive motor, for example in an (e.g., linear) actuator system.

BRIEF DESCRIPTION OF THE DRAWINGS

FIGS. 5A, 5B and 5C are exploded and isometric views of actuator and motor systems, including electrical diagrams, with radially or perpendicularly mounted rotor capacitors and an interleaved rotor/stator capacitor configurations.

FIGS. 6A, 6B and 6C show the actuator and motor systems of FIGS. 5A, 5B and 5C, illustrating the capacitive rotor/stator coupling and associated electrical components.

FIGS. 7A and 7B are exploded and isometric views of actuator and motor systems, including electrical diagram, with axially or longitudinally mounted rotor capacitors and an electrical diagram for a radially adjacent rotor/stator capacitor configuration.

DETAILED DESCRIPTION

Disclosed embodiments relate to motor and actuator systems for use in providing controlled and accurate linear or rotational movement. An actuator has applicability to a variety of work pieces and in a variety of industries. For example, it has particular application to the actuation of welding guns, clamping fixtures, injection molding fixtures and any application in which controlled and accurate linear motion is required. One embodiment has particular use in an application with a relatively short, but highly accurate, thrust stroke, although its use is not limited to that application.

The terms "proximal" and "distal" will sometimes be used to define directions/orientations relative to an actuator. Specifically, the term "proximal" may mean the direction which is toward the encoder end of an actuator, while the term "distal" may mean the direction which is toward the work piece connection end of an actuator.

Figure 1:
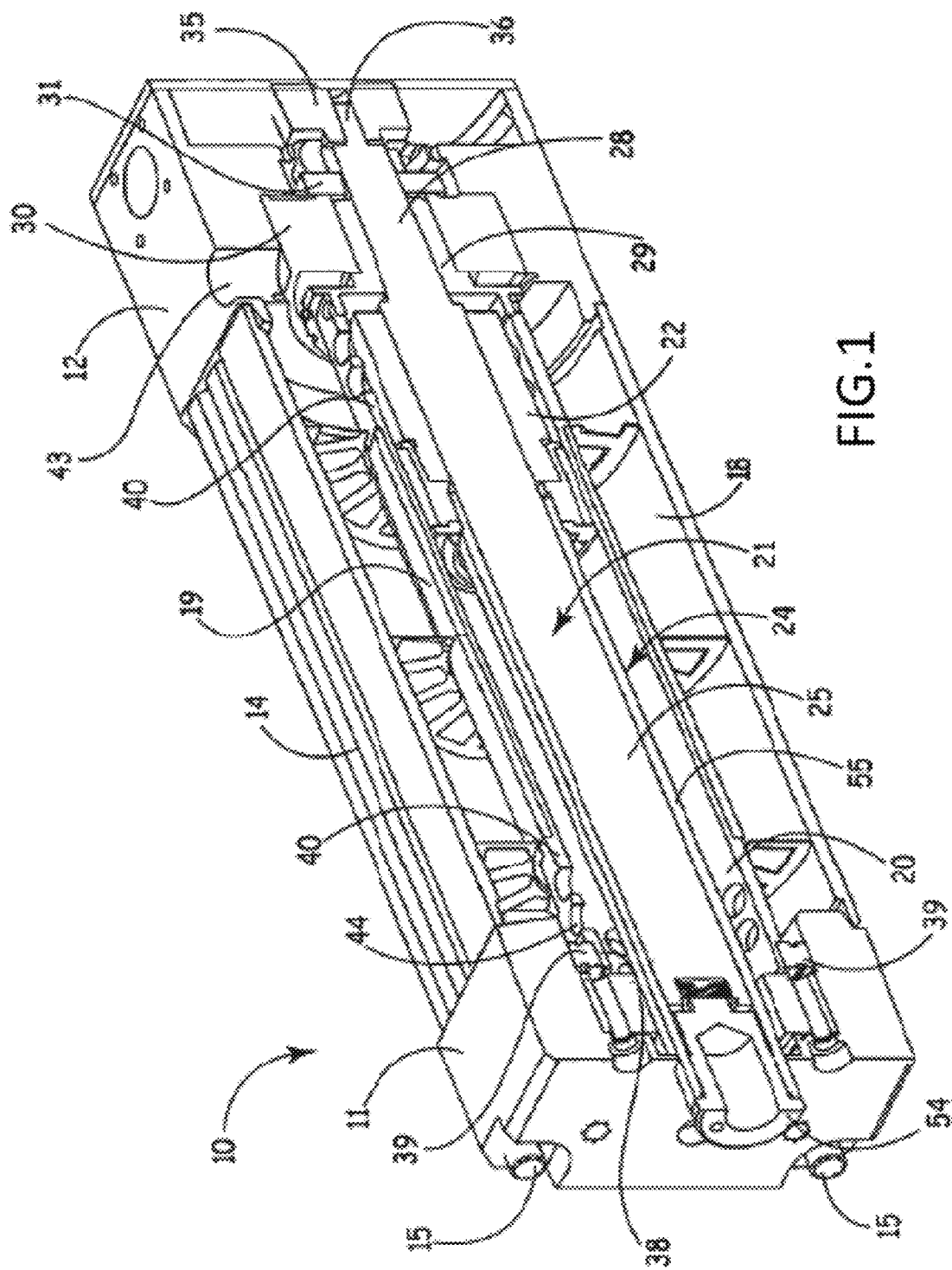
FIG. 1 is an isometric view, partially in section, of one embodiment of an actuator. The section portion is viewed along a plane extending along and through the longitudinal axis of the actuator.
Figure 2:
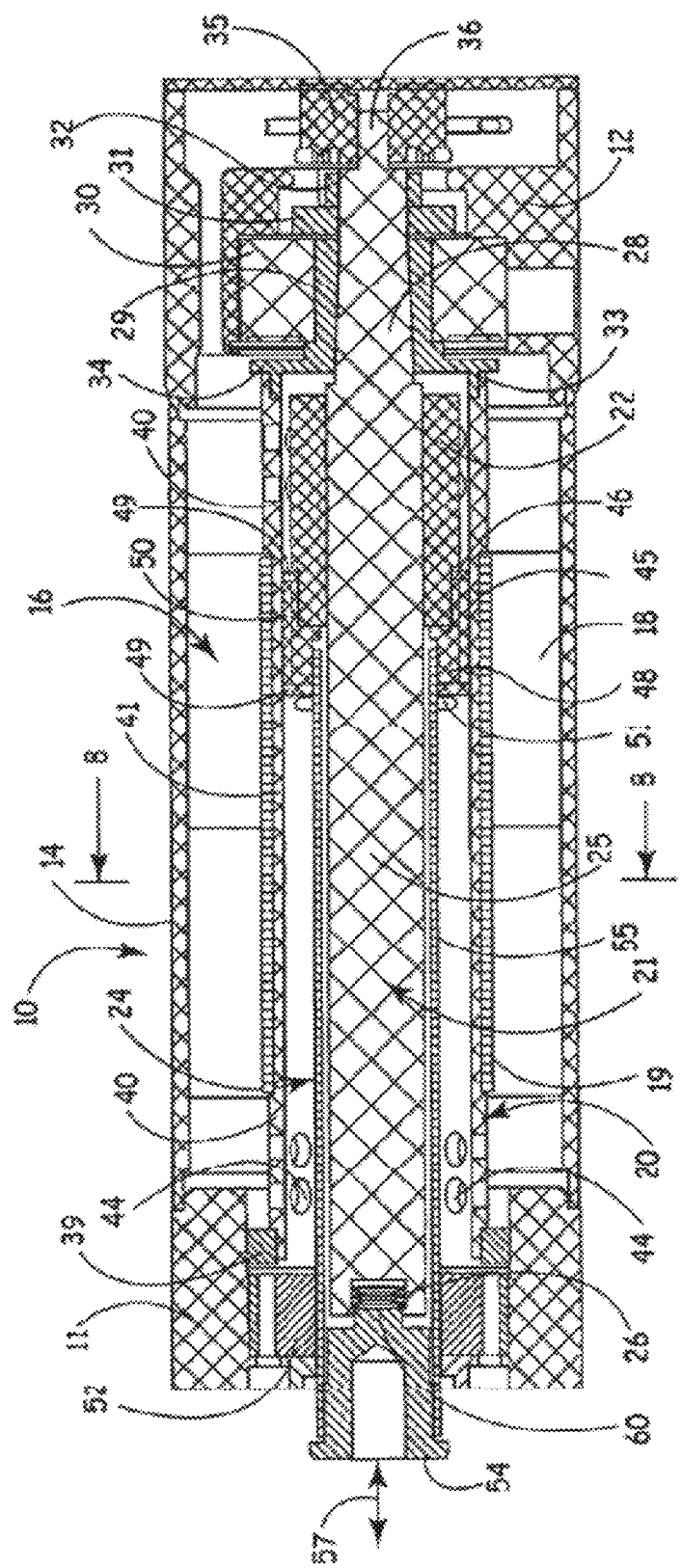
FIG. 2 is a view, partially in section, of the actuator of the embodiment of FIG. 1 as viewed along a plane extending along and through the longitudinal axis of the actuator.
Figure 3:
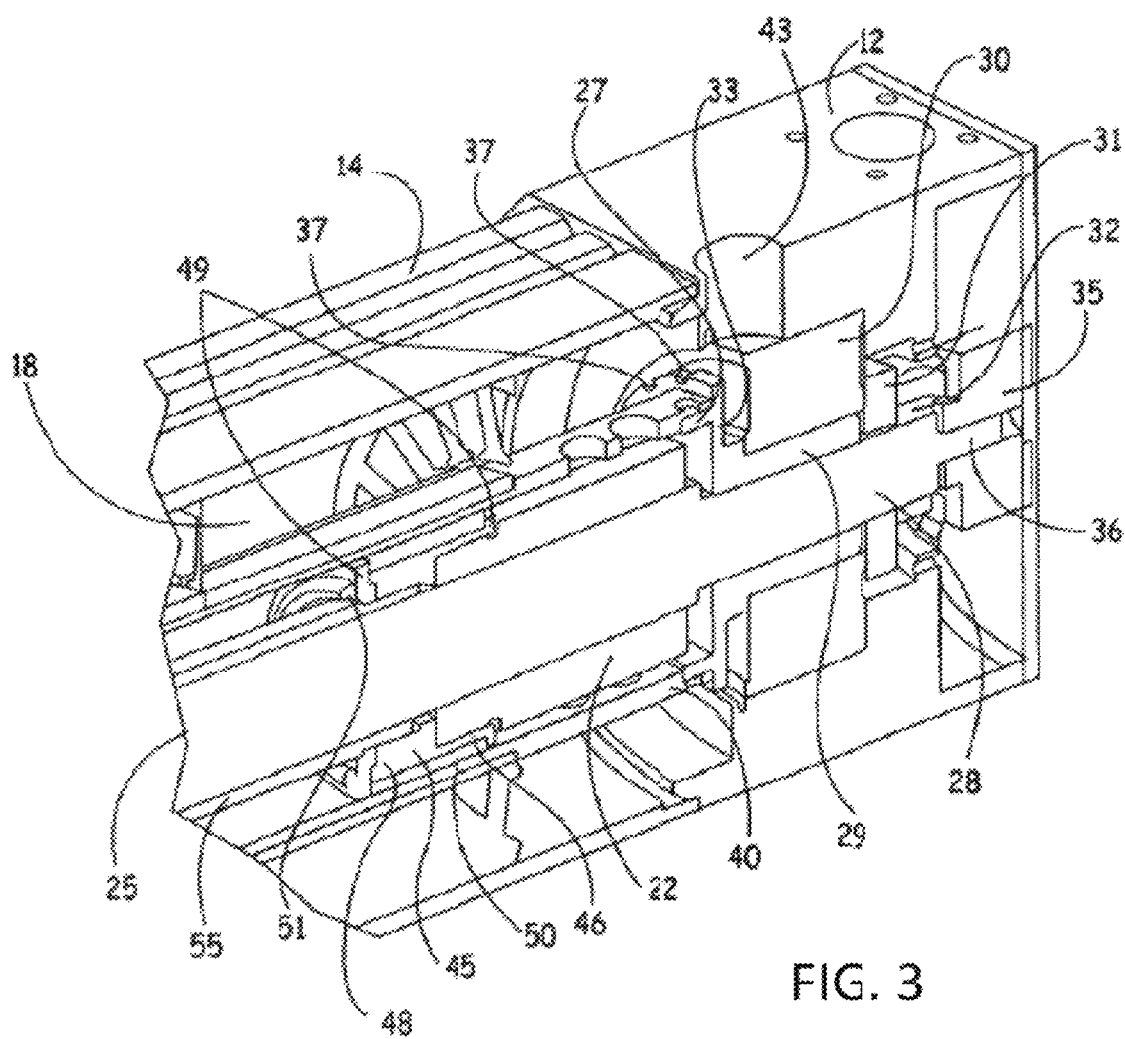
FIG. 3 is an enlarged isometric view of the proximal end of the actuator of FIG. 1 showing the relationship between the rotor, the threaded shaft and the thrust tube.
Figure 4:
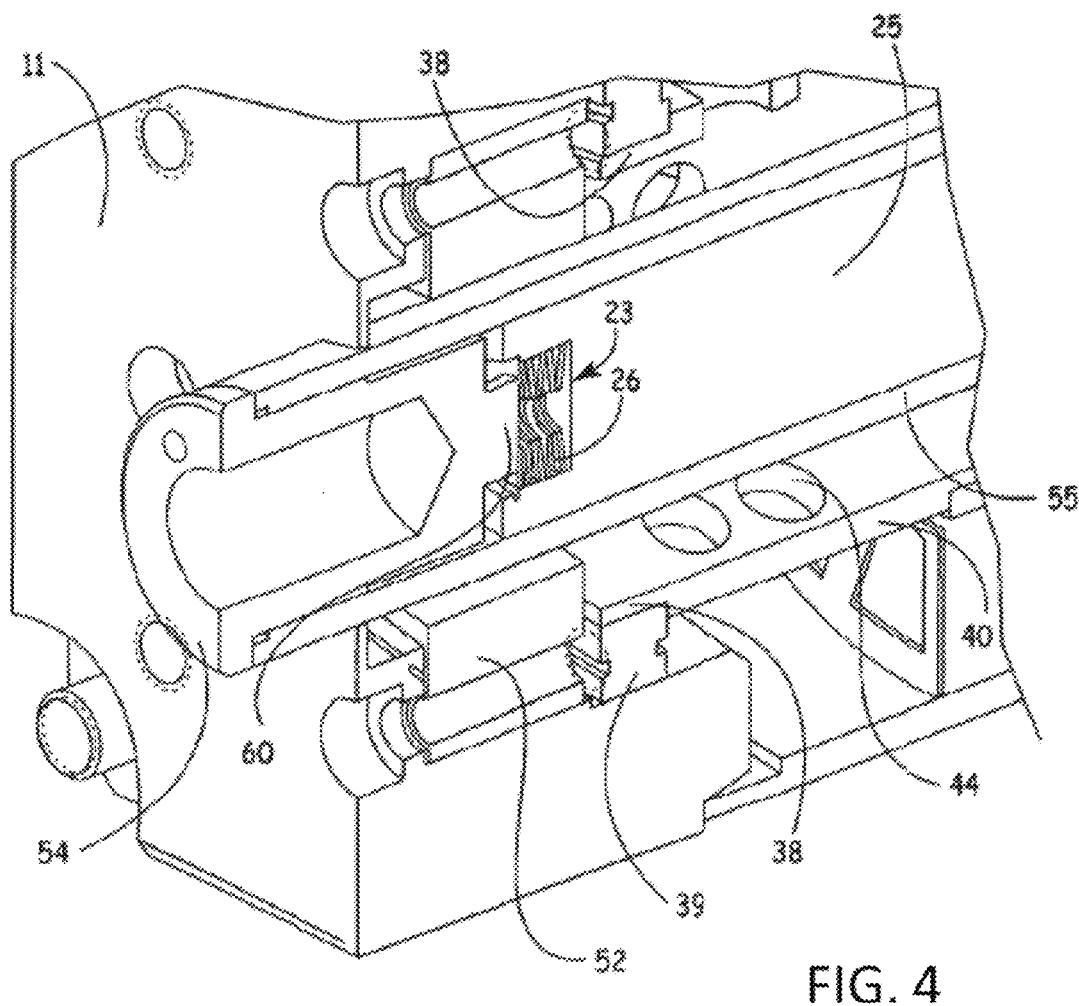
FIG. 4 is an enlarged isometric view of the distal end of the actuator of FIG. 1.

In describing a first aspect of an embodiment, reference is made to FIGS. 1, 2, 3, and 4. FIGS. 1 and 2 illustrate isometric and sectional views, respectively, of an aspect of an embodiment, while FIGS. 3 and 4 illustrate enlarged isometric/sectional views of the proximal and distal ends. In general, an embodiment may use what may be referred to in the art as a hollow shaft motor comprising motor windings or stator capacitors and a magnetically or capacitively coupled rotor which surround a centrally located linear thrust mechanism.

An actuator 10 may include an actuator housing comprised of a distal head end or block 11, a proximal head end or block 12 and a centrally positioned peripheral housing portion 14. The housing section 14 is positioned between the end blocks 11 and 12 and is retained in that position between the blocks 11 and 12 by a plurality of elongated threaded members 15 (FIG. 1) in a conventional manner. A hollow shaft motor 16 (FIG. 2) comprising a plurality of motor windings or stator capacitors 18, a plurality of motor magnets or rotor capacitors 19 and a rotor 20 are positioned between the end blocks 11 and 12 and radially inwardly of the housing portion 14.

An externally threaded, elongated shaft or lead screw 21 and an internally threaded nut 22 together comprise a linear thrust mechanism. The linear thrust mechanism, comprised of the screw 21 and the nut 22, is positioned radially inwardly from the rotor 20 and functions to convert rotational motion of the rotor 20 to linear movement of a thrust tube or load transfer member 24. As shown, the rotor surrounds a substantial portion of the thrust assembly.

More specifically, the elongated, externally threaded screw 21 includes a main, externally threaded section 25 which is provided with continuous threads along a substantial portion of its length. As used herein, the term "thread" or "threaded" to define the threaded section 25 of the screw 21 may include any conventional or other threads such as ACME threads, roller screw threads, ball nut threads or any means known in the art to convert rotational motion to linear motion. The distal end of the threaded section 25 is provided with a recessed area 23 (FIG. 4). This recessed area 23 includes compliant means in the form of a plurality of Belleville or wave washers 26 or other depressible spring type members to cushion impact between the distal end of the screw 21 and the thrust tube 24. Such impact cushioning is particularly needed during power up or in the case of a runaway. In such situations, the compliant means 26 assists in preventing or reducing lockup of an actuator and possible damage to the nut 22 (FIGS. 1, 2 and 3).

Alternatively, an (e.g., inverted) ball screw or roller screw arrangement can be utilized, in which the inner surface of the rotor is provided with ball screw or roller screw thread, engaged with a roller screw or ball nut, e.g., with planetary rollers or recirculating ball screw members. In these embodiments, the nut and screw shaft coupling configuration varies accordingly.

The proximal end of the screw 21 may include a tapered section 28 which tapers inwardly toward the proximal end. The proximal end comprises a reduced diameter end section 36 designed for connection to the rotation sensing portion of a rotary encoder 35. The tapered section 28 extends through a hub 29 and is connected for rotation with such hub 29. The hub 29 includes an inner surface having a taper similar to the taper of the section 28. A thrust bearing 30 is positioned radially outwardly from the hub 29 and functions to mount and support the hub 29 and thus the proximal end of the screw 21 within the end block 12. As shown best in FIGS. 2 and 3, the tapered section 28 and the hub 29 are retained relative to the bearing 30 by the retaining washer 31 and the nut 32. Specifically, the bearing 30 is captured between a shoulder portion 34 of the hub 29 and the washer 31. The distal end of the hub 29 includes a radially extending flange 33 and an axially extending rotor mounting portion 27 for mounting and supporting the proximal end of the rotor 20.

The outer peripheral edge of the flange 33 includes a plurality of notches or recessed areas 37. These notches or areas 37 are accessible to the end of a screwdriver or other tool (not shown) through an access hole 43 in the end block 12 to provide a manual override feature to the actuator. If a crash or lockup occurs or if motor power is lost, the end of a screwdriver or other tool can be inserted through the hole 43 to engage the notches 37 and manually rotate the flange 33 and thus the rotor 20. This rotation releases the lockup and permits an actuator to resume operation.

A rotary encoder 35 or other similar means is mounted to the end section 36 of the threaded screw 21, either directly or through a coupling as shown in the embodiment discussed below. Because of axial and other forces being applied to the screw 21 during operation, it is preferable for the body of the encoder 35 to be connected to the actuator housing through a flexible mount. Such a flexible mount is known in the art. In the preferred embodiment, the encoder 35 is a hollow shaft encoder (either incremental or absolute) having a central rotation sensing member or portion mounted directly onto the proximal end extension 36 of the screw 21.

In one embodiment motor 16 may be a hollow shaft motor comprising a centrally located, hollow rotor 20 and one or more stationary motor windings or stator capacitors 18. The windings or capacitors 18 are positioned radially outwardly of the rotor 20 (or interleaved with the rotor capacitors) and are mechanically coupled to or otherwise fixed relative to the actuator housing. Rotor 20 is a generally cylindrical member having a generally cylindrical outer surface and a hollow cylindrical interior surface. The distal end of the rotor 20 is provided with a recessed portion 38 to accommodate a bearing 39 (FIGS. 1, 2 and 4). The bearing 39 is an axial floating bearing which supports and stabilizes the distal end of the rotor 20 relative to the distal end block 11. Because the bearing 39 is allowed to float axially, it accommodates any thermal expansion of the rotor 20 during operation. In one embodiment, the proximal end of the rotor 20 is connected with the axially extending rotor mounting portion 27 of the hub 29. This connection may be rigid so that rotation of the rotor 20 causes corresponding rotation of the hub 29 and, in the embodiment of FIGS. 1-4, the screw 21.

The central portion 41 of the rotor 20 is provided with a plurality of motor magnets or capacitors 19. As shown, the magnets or capacitors 19 are mounted so that they extend axially along an outer surface of the rotor 20 between its proximal and distal ends 40, 40. Preferably, the magnets or capacitors 19 are inlaid within an outer surface portion of the rotor as shown best in FIGS. 5, 6 and 7. Specifically, axially extending portions of the outer surface of the central portion 41 of the rotor 20 are removed by machining or the like to form axially extending channels or grooves 47 around the cylindrical periphery of the rotor 20. These channels or grooves 47 permit the magnets or capacitors 19 to be inlaid within these channels or grooves 47 in the outer surface of the rotor 20. As shown, this provides the rotor 20 with thicker wall sections at the proximal and distal ends 40,40 extending axially outwardly on either side of the magnets or capacitors 19 and thinner wall sections 41 in the channel areas where the magnets or capacitors are mounted. This structure also provides a radially thicker, axially extending rib or section 42 between adjacent magnets or capacitors 19 and between adjacent channels 47. This magnet or capacitor mounting structure enables the mass of the rotor 20 to be reduced in the area of the thinner walls 41, while still providing sufficient material in the form of the axially extending ribs 42 to insulate between adjacent capacitor plates or preclude or limit core saturation of the magnets, where used. These ribs 42 provide two functions. First, it facilitates simple assembly without additional tooling for alignment. Second, it provides additional material to reduce or prevent core saturation due to the high flux of the magnets, where used. Because the rotor wall thickness in the area of the channels 47 is very thin, without this additional material of the ribs 42, saturation is likely to occur. This added material of the ribs also aids in prevention of flux leakage into the rotor core, or in preventing charge leakage by providing an insulating material between adjacent conducting capacitor plate components.

Accordingly, the rotor structure in accordance with the present invention preferably includes a plurality of elongated magnets or capacitors 19 mounted to the exterior of the rotor 20 with such magnets or capacitors 19 being circumferentially spaced from one another and with the thickness of the rotor wall portions 41 in the area of the magnets or capacitors 19 being thinner than the rotor wall portions 42 in the area between the side edges of the circumferentially spaced magnets or capacitors 19. In a preferred structure, the magnets or capacitors 19 are partially inlaid relative to the areas 42. Thus, the inner surfaces of the magnets or capacitors 19 are positioned radially inwardly of the outer surface of the areas 42, and the outer surface of the magnets or capacitors 19 is positioned radially outwardly of the outer surface of the areas 42.

As shown, the outer or proximal and distal ends of the rotor are provided with a plurality of holes or apertures 44 extending through the wall sections 40 for the purpose of reducing inertia of the rotor 20. This in turn reduces the amount of torque required to accelerate and/or decelerate the rotor 20. If desired, the holes 44 can be eliminated.

When mounted in an actuator, the distal end of the rotor 20 is supported relative to the end block 11 via the axial floating bearing 39 and the proximal end of the rotor 20 is connected with the portion 27 of the hub 29 for rotation therewith. The portion 27 and the hub 29 are in turn supported relative to the end block 12 by the thrust bearing 30. Thus, as the rotor 20 rotates, it rotates the hub 29 which in turn rotates the threaded screw 21.

The linear motion or thrust assembly of the actuator may include the thrust tube or load transfer member 24, the threaded nut 22, the threaded screw 21 and the connection and bearing support member 45 between the nut 22 and tube 24. The member 45 includes a proximal end 46 with internal threads. These internal threads permit the end 46 to be threadedly connected to external threads on the distal end portion of the nut 22. The member 45 also includes a distal end 48 with internal threads. These internal threads permit the end 48 to be threadedly connected to external threads on the proximal end of the thrust tube 24. Outer bearing retaining flanges 49 on each end of the member 45 retain a sleeve shaped bearing member 50. The bearing member 50 is a cylindrical sleeve section constructed of a low friction plastic or other material which engages and moves axially along the inner surface of the rotor 20 to guide axial movement of the proximal end of the thrust tube 24.

The thrust tube guide assembly which comprises the connecting member 45 and the bearing 50 assists in removing side loading from the screw 21 and the nut 22 by aligning the thrust tube 24 within the rotor 20. With the above-described guide assembly, any side load applied to the thrust tube 24 beyond the distal end block 12 is transferred to the guide assembly rather than to the nut 22. The guide assembly then transfers such load to the rotor 20 which is in turn supported by the distal bearing member 39.

In a preferred embodiment, a cushion or impact reducing member 51 is provided on the distal side of the member 45. In a preferred embodiment, this member 51 may be an O ring or other compressible material. During operation, this member 51 may engage the proximal surface of the guide bushing 52 in the case of a runaway or during power up procedures, thereby preventing or limiting damage to the nut 22.

The nut 22 is connected with the proximal end of the thrust tube 24 through the member 45 as described above. The nut 22 includes internal threads which mate with the external threads on the outer surface of the screw 21. As described above with respect to the screw 21, the internal threads of the nut 22 and the external threads of the screw 21 may be any conventional or other threads such as ACME threads, roller screw threads, ball or ball nut threads or any other means known in the art to convert rotational motion to linear motion. In some embodiments, the threads of the nut 22 and the screw 21 are recirculating ball threads.

As described above, the proximal end of the thrust tube 24 is connected with the nut 22 by the connection member 45. Accordingly, the nut 22, the connection member 45 and the thrust tube 24 move axially in unison along the screw 21. The distal end of the thrust tube 24 includes a work piece connection member 54 to which a work piece (not shown) may be connected. An inwardly extending portion 60 of the member 54 engages the washers 26 in the event of a runaway or during power up procedures or when the thrust tube 24 is in its fully retracted position. The thrust tube 24 includes an elongated, hollow tubular portion 55 which extends between its proximal and distal ends. The tubular portion has a hollow interior to receive and accommodate the threaded lead screw 21. The exterior of the tube 55 is provided with a pair of diametrically opposed anti-rotation flat portions 56. These flat portions 56 extend the length of the tubular portion 55 and engage corresponding inner flat surfaces 58 in the end block 11 and corresponding inner flat surfaces in the guide bushing 52 to prevent the thrust tube 24 and thus the connection member 45 and the nut 22 from rotating.

When the motor 16 is actuated, the rotor 20 is caused to rotate in a first direction. Because the proximal end of the rotor may be connected with the hub 29, which is in turn connected to the screw 21, rotation of the rotor 20 may result in corresponding rotation of the screw 21 in the first direction. Because the thrust tube 24 and thus the member 45 and the nut 22 are prevented from rotating, rotation of the screw 21 relative to the nut 22 causes the nut 22 and thus the connection member 45 and the thrust tube 24 to move linearly along the screw 21 in a first linear direction. If the rotor 20 is caused to rotate in the opposite or second direction, the screw 21 is similarly rotated in the opposite or second direction. This results in the nut 22, the connection member 45 and the thrust tube 24 being moved linearly in the opposite or second direction. Thus, rotational movement of the rotor 20 results in corresponding linear movement of the thrust tube 24 as shown by the directional arrow 57 (FIG. 2). In other embodiments, the motor cooperates with another motor, for example via a clutch or other linkage.

Capacitive Motor Systems

FIGS. 5A, 5B and 5C, 6A, 6B, 6C, 7A, 7B, 8A and 8B are exploded and isometric views of actuator and motor systems as described in any of the embodiments herein. Suitable applications include, but are not limited to, actuator system or assembly 10 with motor 16, rotor 20, shaft or screw 21, actuator nut 22, and one or more stator or housing sections or portions 14.

FIGS. 5A, 5B and 5C are exploded and perspective views of the linear actuator and motor systems, including electrical diagrams, with radially or perpendicularly mounted rotor capacitors and an interleaved rotor/stator capacitor configuration. FIGS. 6A, 6B and 6C show the linear actuator and rotor of FIGS. 5A, 5B and 5C, illustrating the capacitive rotor/stator coupling and associated electrical components.

As shown in FIGS. 5A-5C and 6A-6C, the actuator assembly includes a rotor with transversely or radially mounted rotor capacitor discs 19D mounted to the radially outer surface of the rotor 20, interleaved with corresponding capacitor discs 18D extending radially inward from the inner surface of the motor/actuator housing 14. The stator discs 18D are attached to the motor housing or stator assembly 18, extending radially inward from the stator or housing 14 toward the rotor 20, arranged in spaced fashion along the axis A of rotation of the rotor 20, and spaced from the rotor surface.

The rotor discs 19D are attached to the outer surface of the rotor 20, and extend radially outward toward the stator housing 14. The rotor discs 19D are also arranged in a spaced fashion along the axis A of rotation of the rotor 20, and spaced from the stator surface.

The stator and rotor discs 18D, 19D each include one or more (e.g., a plurality of) conductive plates (or plate areas) 18P, 19P, separated by non-conducting materials 18N, 19N, oriented radially or transversely on the surface of each disc 18D, 19D, forming complementary capacitive plates or capacitive components (e.g., conducting plates), with the rotor and stator capacitor components interleaved in capacitively coupling fashion along the axial extent of the rotor. A power source (e.g., three phase power source) can be utilized to energize the stator capacitors utilizing wires, leads or other conducting elements, and to drive the rotor 20 into rotation about the rotational axis A via torque exchange achieved by timing of the corresponding charges on the adjacent capacitor plates 18P, 19P.

In some designs, a brush or commutator arrangement can be utilized to actively charge the capacitor plates. Alternatively, the stator plates can be actively charged by the power source, and the rotor plates can be passively charged via the capacitive coupling. The former design has the advantage of active control of the rotor plate charges, while the latter design has the advantage of a simpler design with reduced weight and component count.

Figures 8A, 8B:
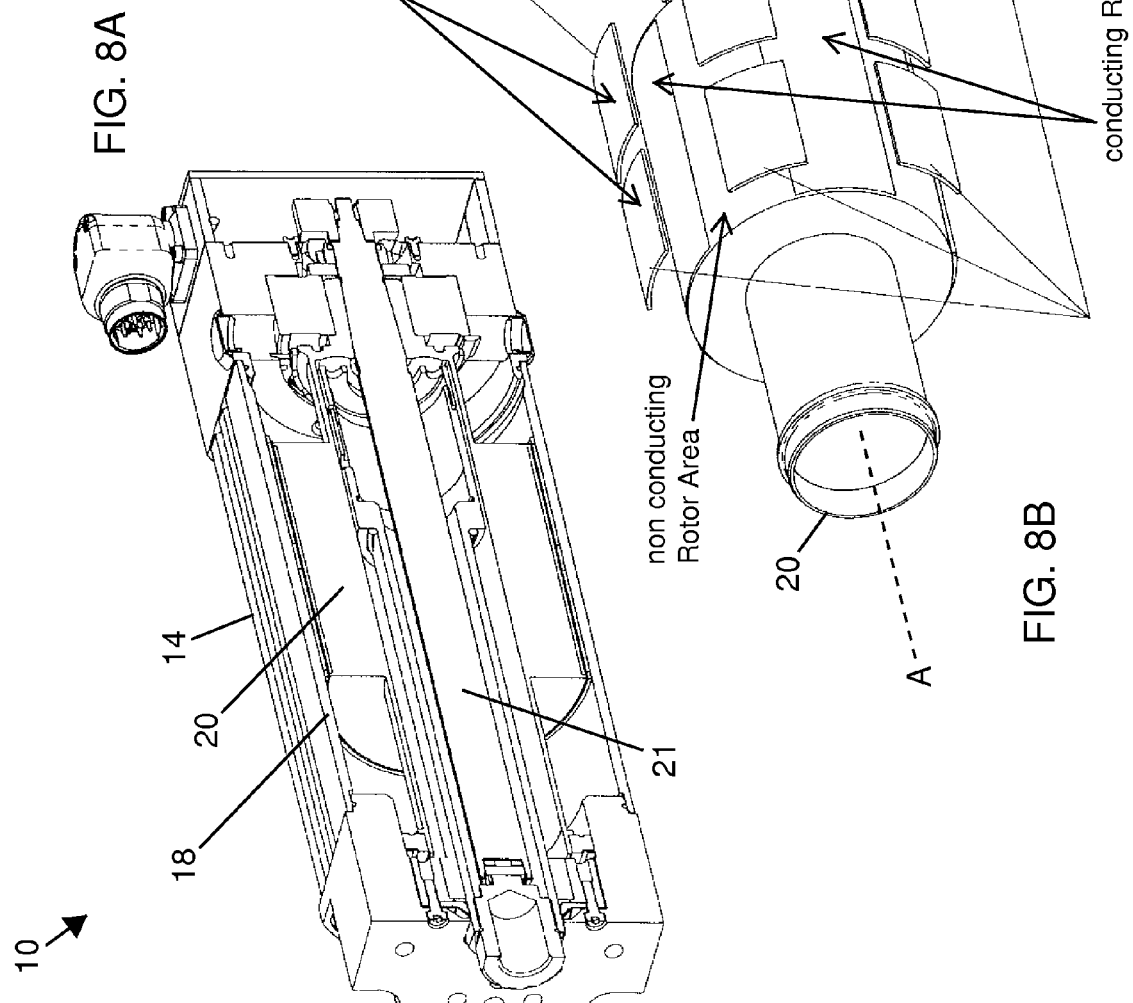
FIGS. 8A and 8B show the linear actuator and motor systems of FIGS. 7A and 7B, illustrating the capacitive rotor/stator coupling and associated electrical components.

FIGS. 7A and 7B are exploded and perspective views of actuator and motor systems, including electrical diagrams, with axially or longitudinally mounted rotor capacitors and an electrical diagram for a radially adjacent rotor/stator capacitor configuration. FIGS. 8A and 8B show the linear actuator and rotor of FIGS. 7A and 7B, illustrating the capacitive rotor/stator coupling and associated electrical components.

FIGS. 7A-7B and 8A-8B show a parallel capacitive coupling arrangement, in which the rotor capacitor components 19P are arranged axially along or parallel to the rotor 20 surface, with similar stator capacitor components 18P arranged along the corresponding stator 18 surface, mechanically coupled to the inner surface of the housing 14. In these embodiments, the complementary capacitor plates 18P, 19P may have a curvilinear (e.g., cylindrical section) surface, arranged in close proximity to improve capacitive coupling.

A power source (e.g., three-phase) is coupled to the stator capacitor components 18P via conducting leads, in order to energize the stator capacitor plates 18P and drive the rotor 20 into rotation about the rotational axis A. As shown in the figures, the conducting rotor and stator plate areas are separated by nonconducting materials and areas. As opposed to a conventional magnetically coupled design, the back iron and other flux directing components would either be absent, or replaced with lighter insulating materials to reduce weight.

In some capacitive coupling motor designs, an air bearing arrangement can be used to "float" the rotor in coaxial arrangement on a cushion or air (or other fluid) within the stator housing. In linear actuator applications, thrust bearings may be utilized to transfer linear forces and loading, and radial bearings may be provides to maintain rotor positioning when under asymmetric or off-axis loads, including radial for and loading components.

Generally, the capacitive coupling (or capacitance) defined between the stator and rotor plates depends upon the charge to voltage ratio, with capacitance varying linearly with the overlapping plate area and inversely with the plate separation. Precision control of the rotor and stator plate spacing can thus improve motor performance, by providing uniform spacing for greater coupling and torque transfer, without contact.

A layer of dielectric lubricant or a protective anti-friction coating can also be applied to the adjacent surfaces, in order to prevent or reduce damage to the plate and disc structures if contact does occur, and to improve capacitance by providing a dielectric material with high dielectric constant between the adjacent rotor and stator plates. In addition, a separate dielectric material or component could also be used in place of the air gap (e.g. an oil fluid or a polymer material), to improve spacing and capacitance.

Coupled Magnetic and Capacitive Motor Systems

Figure 9:
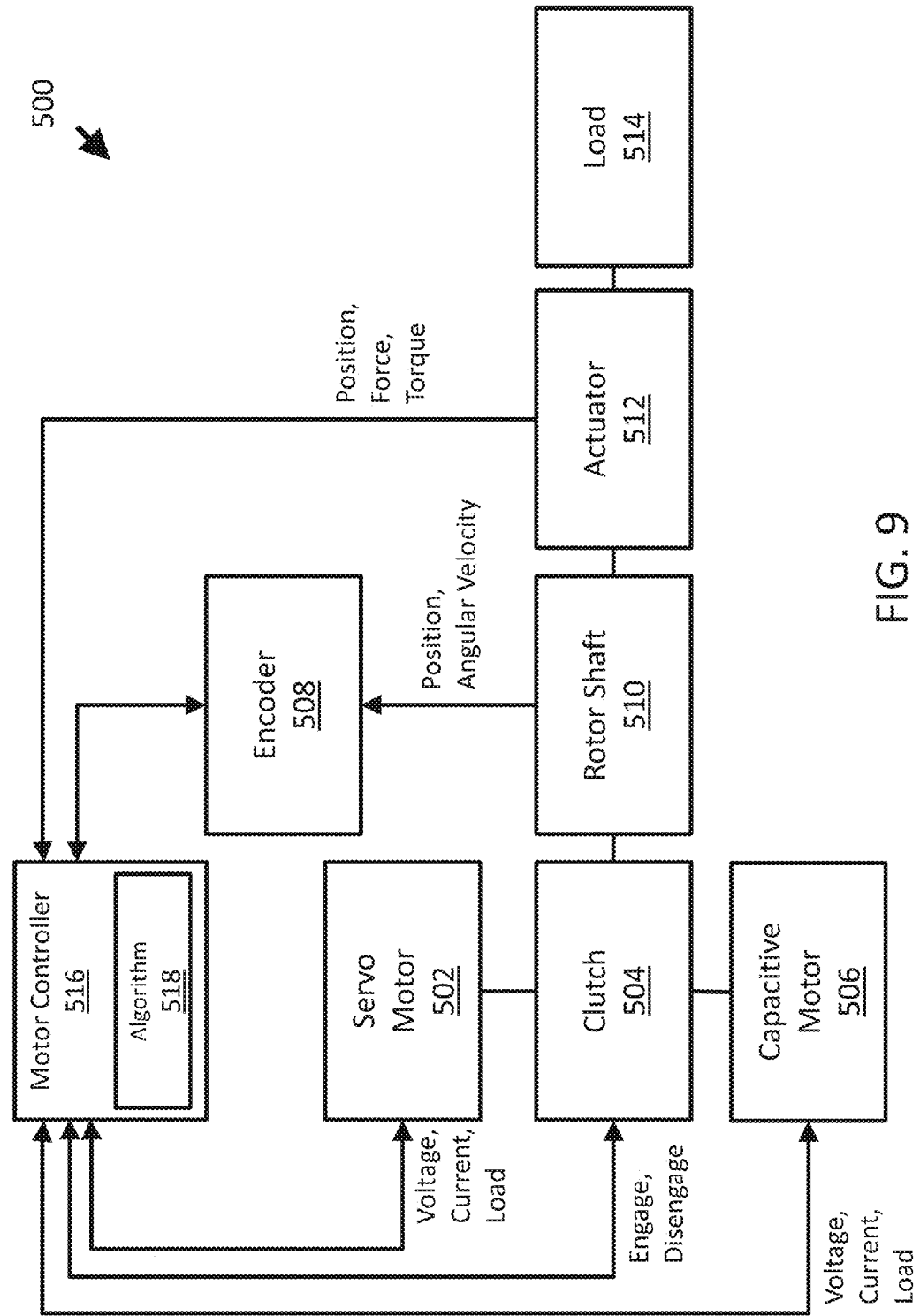
FIG. 9 shows a block diagram of an embodiment of a motor or actuator system with coupled capacitive and magnetic drive motors.

FIG. 9 is a block diagram of system and a method for using an embodiment of a coupled capacitive and magnetic motor or actuator system 500. Servo motor 502 is a magnetic drive rotary motor capable of converting energy (e.g. electrical energy) into rotational motion. Servo motor 502 may be capable of receiving control input from a motor controller in order to direct its operation, for example voltage, current, load, and other parameters. Servo motor 502 may also include various sensors in order to output information to, for example, motor controller 516 and/or a human operator. Specifically, servo motor 502 may be specifically configured or designed to provide certain drive characteristics. For example, servo motor 502 may be configured to provide rotational velocity at a given operating voltage, and torque at a given operating current. Servo motor 502 may also include an output connector or motor shaft that allows its rotational motion to be transferred to other components of system 500.

Capacitive drive motor 506 may be, for example, a capacitively coupled motor as previously described and as shown above. Like (magnetic drive) servo motor 502, capacitive motor 506 may receive control input from and send information to motor controller 516 to direct its operation. Capacitive motor also has an output connector or motor shaft that allows its rotational motion to be transferred to other components of system 500. Capacitive motor 506 may be configured to provide certain drive characteristics, for example, torque at a particular operational voltage, and velocity at a particular operational current.

Clutch 504 may be provided in order to couple the rotation of the servo motor 502 and capacitive motor 506 to a screw shaft or rotor shaft 510. Clutch 504 may operate in various positions, such that both motors 502 and 506 are engaged, such that only one of motors 502 and 506 is engaged, or such that neither of the motors are engaged. In one embodiment, clutch 504 may comprise or operation as a friction clutch, but other designs are possible. The exact design of clutch 504 depends on the configuration of the system, but may include jaw clutches, sliding key clutches, plate clutches, planetary transmission clutches, cone clutches, spring and ball radial detent clutches, wrapped spring clutches, expanding shoe centrifugal clutches, cam and roller clutches, electromagnetic clutches, station clutches, sprag clutches, overrunning clutches, overriding clutches, roller clutches, walking pressure plate clutches, and other clutches as determined by the operational requirements of system 500.

Rotor shaft 510 is a shaft that couples the rotational motion from one or both of motors 502, 506 via clutch 504 to actuator 512. Rotor shaft 510 may be provided with encoder 508 coupled thereto, or another sensor system for reporting position, angular velocity, and other measurements to motor controller 516.

Actuator 512 is configured for transferring linear or rotational motion to load 514. Load 514 is a source of mechanical resistance acting against the force, torque or translational/rotational motion provided by actuator 512. When torque or rotational motion is desired, actuator 512 may directly provide the rotational motion from the rotor shaft 510 through a direct coupling to load 514. In some embodiments, actuator 512 may include a connection to a gearbox or other intermediary component before transferring the torque or rotational motion to load 514. In some embodiments, torque or rotational motion from rotor shaft 510 may be converted into linear motion before being transferred to load 514, as described previously in, for example, FIGS. 1-4.

In one embodiment, actuator/motor system 500 has a motor controller 516 operably coupled to servo motor 502, clutch 504, and capacitive motor 506. Motor controller 516 is a device or system of devices configured for controlling the operation or performance of motors 502 and 506 and actuator 512, for example by executing algorithm 518. Algorithm 518 is a set of digital or analog computer instructions capable of receiving as input one or more characteristics of rotor shaft 510, actuator 512, servo motor 502, clutch 504, and capacitive motor 506, performing operations based on the input, and then controlling the operation of servo motor 502, clutch 504, or capacitive motor 506. For example, motor controller 516 may directly or indirectly control the current, voltage, load, and other parameters for operating motors 502 and 506, using algorithm 518. In some embodiments, the motor controller may also comprise an algorithm 518 with overload prevention circuits or software, pre-set operating conditions, a controller, a user interface for allowing an operator to change parameters, microcontrollers, network interface hardware and software for remote operation, and other systems or series of computer systems configured to control and direct the operation of motors 502 and 506, with actuator 512 and load 514.

In an embodiment with a clutch 504 positioned between or in mechanical engagement with one or both of motors 502, 506, the motor controller may be coupled to control the operation of clutch 504. For example, motor controller 516 may control the engagement or disengagement of the clutch 504 such that both, one, or none of the motors transfer rotational force to rotor shaft 510.

In addition to outputting commands or parameters, motor controller 516 is capable of receiving input and feedback from, for example, encoder 508, servo motor 502, clutch 504, capacitive motor 506, and/or actuator 512. Motors 502, 506 may send operating information back to motion controller, including voltage, current, load, temperature, throttle position, indications of motor health, error codes, and other information reported by the motor or a sensor on the motor. Clutch 504 may send operating information back to the motor controller such as, present engagement or disengagement status, position, and other information relating to the operation of a clutch or linkage.

Motor controller 516 may also receive input from encoder 508. Encoder 508 is a device or system of devices that converts information relating to the performance and operation of rotor shaft 510 into a format capable of being interpreted and used by motor controller 516. For example, encoder 508 may be a separate analog-to-digital converter that receives input from sensors coupled to rotator shaft 510. In other embodiments, encoder 508 includes a sensor or combination of sensors coupled to rotator shaft 510. For example, encoder 508 may convey rotational information relating to absolute position value, incremental TTL signal, angular velocity and incremental sinusoidal signal, or other customized analog or digital computer signals.

The capability of motion controller 516 to both receive and send information to and from the various components of system 500 allows the system to have a feedback loop control system, which allows for precise control of the different components and systems of system 500.

Figure 10:
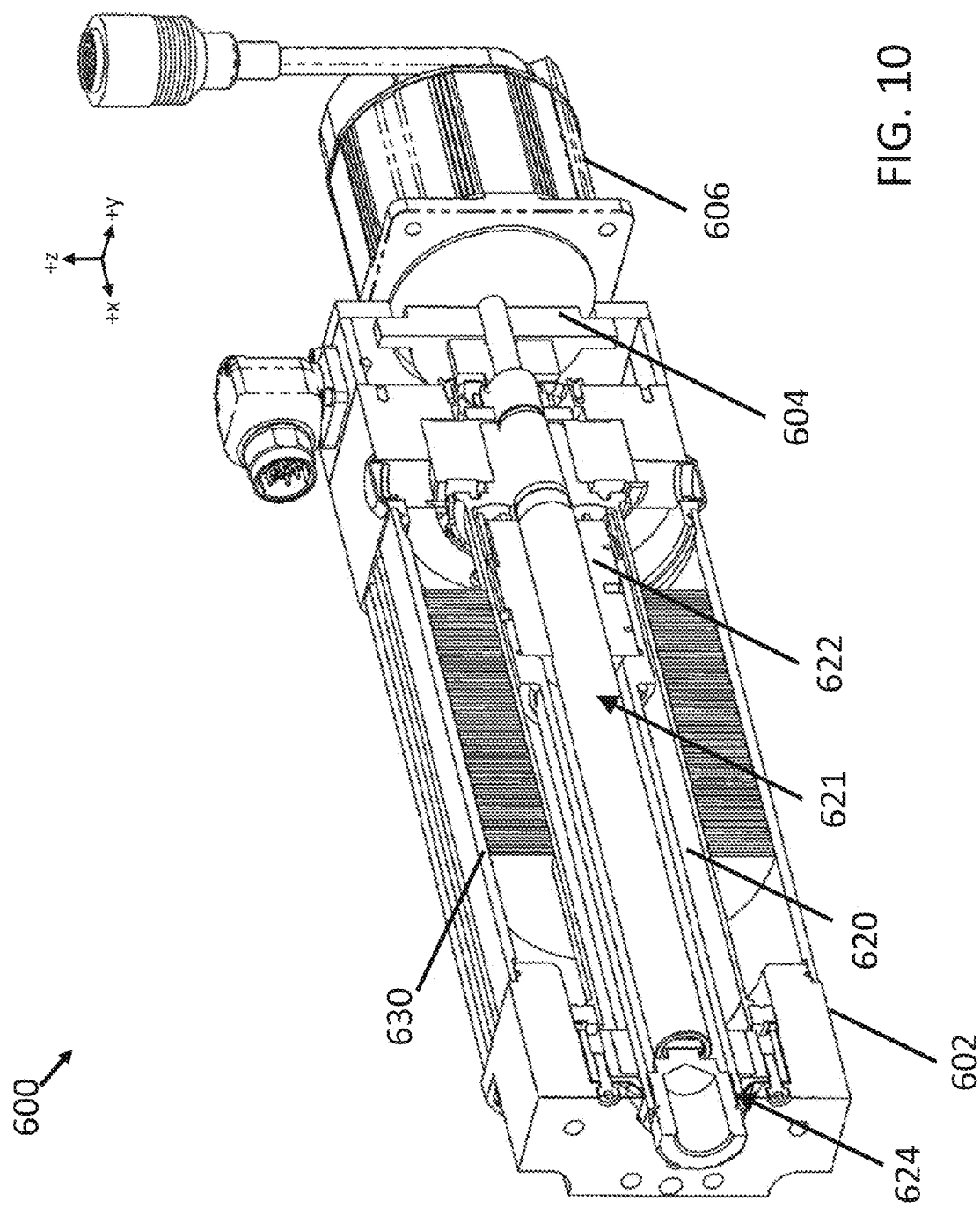
FIG. 10 shows an embodiment of a motor system with capacitive and magnetic drive motors in a coaxial arrangement.

FIG. 10 illustrates motor system 600 with a capacitive motor 602, clutch 604, and magnetic drive servo motor 606 in an in-line or co-axial arrangement. Clutch 604 may be selectively coupled to capacitive motor 602, servo motor 606, rotor 620 or combinations thereof such that the rotational force from the motors 602, 606 can be transferred to rotor 620. A linear thrust mechanism comprising an externally threaded, elongated shaft or lead screw 621 and an internally threaded nut 622 may be positioned radially inwardly from rotor 620 and functions to convert rotational motion of the rotor 620 to linear movement of a thrust tube or load transfer member 624 in the ±X direction.

Figure 11:
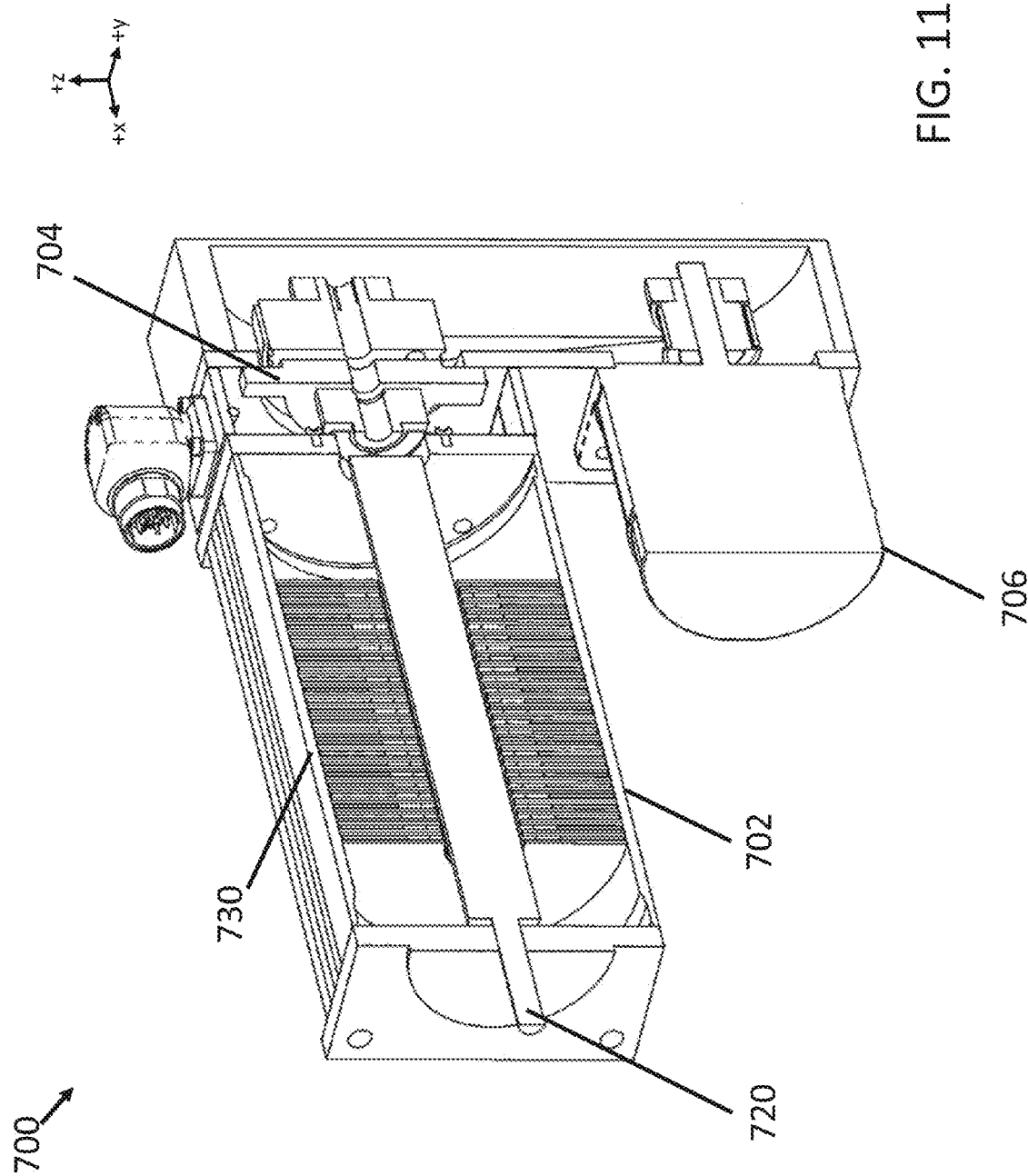
FIG. 11 shows an embodiment of a motor system with capacitive and magnetic drive motors in a parallel arrangement.

FIG. 11 illustrates an embodiment of a motor system 700 configured with magnetic and capacitive drive motors in a parallel arrangement. Clutch 704 may be selectively coupled to capacitive motor 702, magnetic servo motor 706, rotor 720 or combinations thereof such that the rotational force from the motors 702, 706 can be transferred to rotor 720. In this parallel arrangement, servo motor 706 is offset from clutch 704 and capacitive motor 702 in the −Z direction. In this configuration, servo motor 706 may be coupled to clutch 704 using a belt, chain, cable, gears or other methods of transferring rotational motion from servo motor 706 to clutch 704. Rotor 720 is able to operate as a rotational actuator utilizing the rotational forces from motors 702 and 706 provided through clutch 704.

Figure 12:
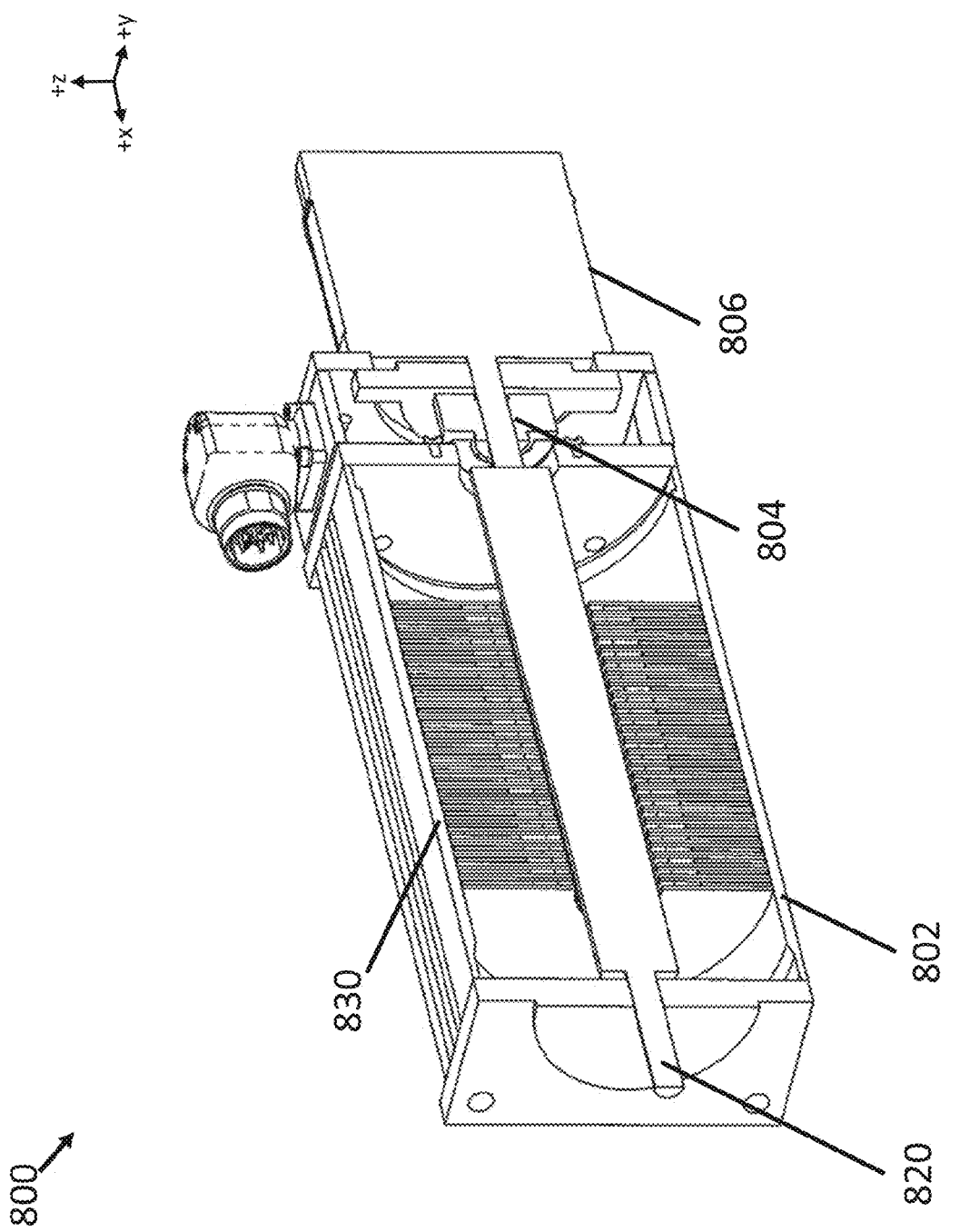
FIG. 12 shows an embodiment of an actuator system with capacitive and magnetic drive motors in a coaxial arrangement.

FIG. 12 illustrates one embodiment of an actuator or motor system with magnetic servo motor and a capacitive drive motor. One particular embodiment takes the form of an (e.g., linear) actuator 800 with a capacitive motor 802, clutch 804, and magnetic servo motor 806 in a co-linear or co-axial arrangement. Clutch 804 may be selectively coupled to capacitive motor 802, servo motor 806, rotor 820 or combinations thereof such that the rotational force from the motors 802, 806 can be transferred to rotor 820. In this parallel arrangement of an actuator, servo motor 806 is offset from clutch 804 and capacitive motor 802 in the −Z direction. In this configuration, servo motor 806 may be coupled to clutch 804 using a belt, chain, cable, gears or other methods of transferring rotational motion from servo motor 806 to clutch 804. Rotor 820 is then able to operate as a rotational actuator utilizing the rotational forces from motors 802 and 806 provided through clutch 804.

Figure 13:
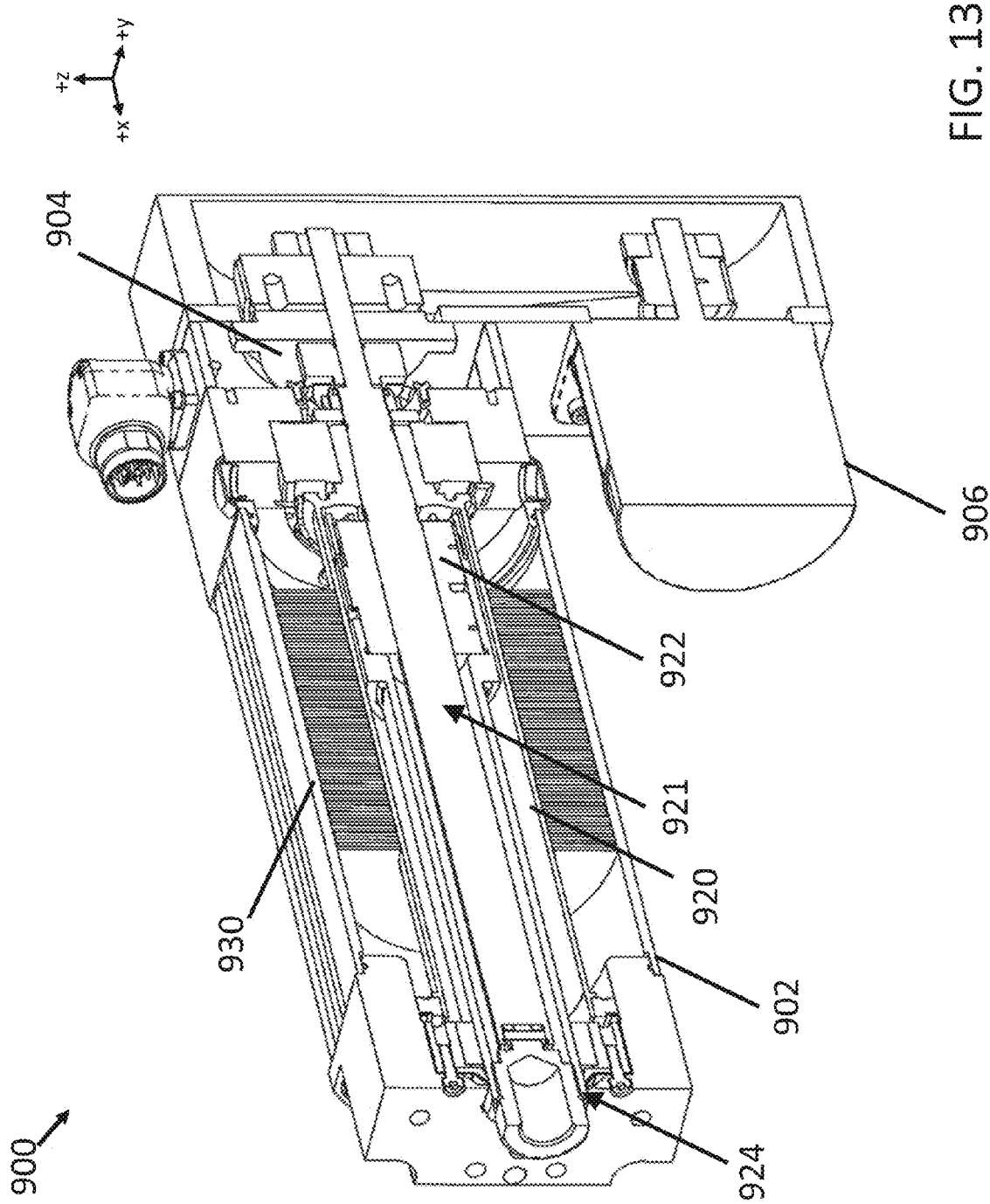
FIG. 13 shows an embodiment of an actuator system with capacitive and magnetic drive motors in a parallel arrangement.

FIG. 13 illustrates one embodiment of an actuator or motor system with a conventional magnetic servo motor and a capacitive drive motor. This particular embodiment takes the form of an (e.g., linear) actuator 900 with a capacitive motor 902, clutch 904, and magnetic servo motor 906 in parallel arrangement. Clutch 904 may be selectively coupled to capacitive motor 902, servo motor 906, rotor 920 or combinations thereof such that the rotational force from the motors 902, 906 can be transferred to rotor 920. Because servo motor 906 is offset from clutch 904 in the −Z direction, a belt, chain, cable, gears or other methods of transferring motion can be used to transfer the rotational motion from servo motor 906 to clutch 904. A linear thrust mechanism comprising an externally threaded, elongated shaft or lead screw 921 and an internally threaded nut 922 may be positioned radially inwardly from rotor 920 and functions to convert rotational motion of the rotor 920 to linear movement of a thrust tube or load transfer member 924 in the ±X direction.

In each of these figures, the positions of the magnetic and capacitive drive motors are merely representative, and may be interchanged without loss of generality. In particular, with the magnetic or capacitive drive motor may be configured in the forward (proximal) or rear (distal) location along the rotational axis. Similarly, either the magnetic or capacitive drive motor may be positioned in a coaxial or parallel arrangement with respect to the rotational axis of the rotor shaft.

Coupling capacitive and magnetic motor systems may allow for the combination of motors with different priorities. For example, a magnetic drive motor that prioritizes speed over torque may be combined with a capacitive motor that prioritizes torque over speed. A motor control can then direct the operation of the coupled motor system in order to produce, for example, motion that combines the torque and speed of the two motors.

EXAMPLES

In various examples and embodiments, an electrically powered linear actuator system may include a housing having a proximal end, a distal end and a longitudinal axis extending between said proximal and distal ends; an elongated screw shaft with external threads, said screw shaft being rotationally moveable relative to said housing; a thrust member having a portion with internal threads engageable with the external threads of said screw shaft, said thrust member being axially moveable relative to said housing; and a motor in said housing.

Said motor may include a rotor surrounding at least a portion of said thrust member, the rotor having a plurality of rotor capacitor components or conductive plates mounted axially along a surface of the rotor, or extending radially therefrom; and a plurality of stator capacitor components or conductive plates or coupled to the housing, the rotor and stator capacitor components configured to drive the rotor via capacitive coupling and torque exchange. A hub may be supported for rotation within said housing near said proximal end operably and indirectly connecting the rotor and the screw shaft, such that the rotor and the screw shaft rotate with one another, the screw shaft extending through the hub.

The actuator system as described above may have the thrust member rotationally fixed. The thrust member may comprise a pair of diametrically opposed flat portions. A guide bushing may be provided with inner flat surfaces engageable with the diametrically opposed flat portions of the thrust member such that the thrust member is rotationally fixed, but axially moveable, relative to said housing. The portion with internal threads may comprise a nut operatively engaged with the screw shaft. The thrust member may further include a thrust tube. A hub bearing may be positioned radially outward from the hub and supporting the hub relative to the housing. The hub may include a rim portion with a plurality of engagement notches and the housing may include an access opening to permit access to the notches for override. The rotor may include a proximal end connected with the hub and an unsupported distal free end. A rotary encoder may be provided having a rotation sensing member rotatable with said rotor.

An electrically powered linear actuator system may include a housing having a proximal end, a distal end and a longitudinal axis extending between said proximal and distal ends; an elongated screw shaft with external threads, said screw shaft being rotationally moveable relative to said housing; a thrust member having a portion with internal threads engageable with the external threads of said screw shaft, said thrust member being axially moveable relative to said housing; and a motor in said housing. The motor may have a rotor surrounding at least a portion of said thrust member, the rotor having a plurality of rotor capacitor components or conducting plates mounted along a surface of the rotor, and a stator disposed about the rotor, the stator having a plurality of stator capacitor components or conducting plates mounted in capacitive coupling relationship with the rotor capacitor components, the stator and rotor capacitor components configured to drive the rotor by capacitive coupling and torque exchange. A hub may be supported for rotation within said housing near said proximal end operably connecting the rotor and the screw shaft, such that the rotor and the screw shaft rotate with one another.

Any of the above actuators or actuator systems may have a plurality of capacitor components mounted axially along the surface of the rotor, or extending radially therefrom. The plurality of capacitor components may be longitudinally arranged along the surface of the rotor or inlaid within channels of the outer surface of the rotor, radially adjacent the corresponding capacitor components disposed on the stator, or the rotor and stator components are arranged on a series of discs arranges in spaced and interleaved fashion along a rotational axis of the rotor, with the rotor capacitor components arranged on radially or transversely extending disks mounted to the surface of the rotor and interleaved with the corresponding stator capacitor components arranged on radially or transversely extending disks mounted to a stator surface coupled to the housing, and extending radially inward from the stator surface toward the rotor.

Axially extending rib areas may be provided between rows of the capacitors extending axially along the surface of the rotor. The rotor may comprise a plurality of holes for reducing inertia of the rotor. Threads of the screw shaft may comprise one or more of ACME threads, roller screw threads, or ball nut threads. A plurality of stator capacitors may be positioned radially outward from the surface of the rotor, the plurality of stator capacitors configured for capacitive coupling with the rotor to drive rotation thereof. The actuator system may further comprise a rotary encoder having a rotation sensing member rotatable with said rotor. A linear actuator system with a capacitively coupled rotor configured for rotation by capacitive coupling with a plurality of stator capacitor components, as shown and described herein.

In a method of operating such a linear actuator with a capacitively coupled rotor to position a thrust component, the capacitively coupled rotor can be configured for rotation by capacitive coupling with a plurality of stator capacitor components, as shown and described herein above. In any of these examples and embodiments, both a magnetically coupled servo motor and a capacitive motor may be coupleable to the shaft, for example using a clutch device and/or motor controller to selectively engage the magnetically coupled and/or capacitive motor for rotational engagement with the shaft. A motor controller can also be configured to selectively drive either or both of the magnetically coupled servo motor and the capacitive motor based on desired torque and rotational speed, and depending on a control algorithm considering the desired torque and speed as compared to the input and output voltages, currents and loads on the magnetically coupled and capacitive motors.

One embodiment may include a rotor shaft; a magnetic drive motor rotationally coupleable to the shaft; a capacitive drive motor rotationally coupleable to the shaft; and an engagement system configured for selectively engaging one or both of the magnetic drive motor and the capacitive drive motor with the rotor shaft. The engagement system may be further configured for selectively disengaging one or both of the magnetic drive motor and the capacitive drive motor from the rotor shaft. In addition, the selectively engaged motor or motors may be rotationally coupled to the shaft and the selectively disengaged motor or motors may be rotationally decoupled from the shaft. The engagement system may also comprise a motor controller configured to selectively engage one or both of the magnetic drive motor and the capacitive drive motor based on a desired rotational speed and/or torque output of the rotor shaft. The motor controller may be configured to control the engagement system based on an operational algorithm comparing voltage, current, and/or loading for each of the magnetic drive motor and the capacitive drive motor to the desired rotational speed and/or torque output of the shaft. The operational algorithm may be configured to compare the voltage and current for each of the magnetic drive motor and the capacitive drive motor to thresholds based on power input and/or power output. Thresholds may include loading thresholds based on the power input and/or power output to each of the magnetic drive motor and the capacitive drive motor. The thresholds may also comprise current thresholds based on a wire gauge for each of the magnetic drive motor and the capacitive drive motor. The motor controller may be configured to disengage one or both of the magnetic drive motor and the capacitive drive motor when the corresponding current threshold is approached or exceeded. In addition, the engagement system may be configured to selectively engage the magnetic drive motor to generate a desired rotational speed of the rotor shaft at a selected operating voltage of the magnetic drive motor. The engagement system may be configured to selectively disengage the capacitive drive motor at the desired rotational speed. The engagement system may be configured to selectively engage the capacitive drive motor to generate a desired torque output of the rotor shaft at a selected operating voltage of the capacitive drive motor. The engagement system may be configured to selectively disengage the magnetic drive motor at the desired torque output. The engagement system may include a clutch configured to selectively engage one or both of the magnetic drive motor and the capacitive drive motor with the rotor shaft. The clutch may be configured to selectively engage the magnetic drive motor based on a desired rotational speed of the rotor shaft and to selectively engage the capacitive drive motor based on a desired torque output of the rotor shaft. In some embodiments, the clutch may be configured to alternately engage and disengage the magnetic drive motor and the capacitive drive motor, respectively, based on a desired rotational speed and/or output torque of the rotor shaft. An embodiment may also comprise comprising an actuator coupled to the rotor shaft, the actuator may be configured to operate on a load based on a desired rotational speed and/or torque output of the shaft. The actuator may be configured to linearly or rotationally position the load based on the rotational speed and torque output of the shaft. The actuator may be configured to transfer force or torque to the load based on the rotational speed and torque output of the shaft. The load may comprise one or more of a welding gun, a punch or machine tool, a spray gun or sprayer, a gripper or grasping device, a vacuum nozzle, and a grinder, polisher or deburring device. The engagement system may comprise a clutch configured to alternately engage one or the other of the magnetic drive motor and the capacitive drive motor. The magnetic drive motor and the capacitive drive motor may be coaxially arranged along a rotational axis of the rotor shaft. The engagement system may comprise a clutch disposed between the magnetic drive motor and the capacitive drive motor along the rotational axis of the shaft. One of the magnetic drive motor and the capacitive drive motor may be coaxially disposed along a rotational axis of the rotor shaft and another of the magnetic drive motor and the capacitive drive motor may be disposed parallel to the rotational axis of the rotor shaft. The capacitive drive motor may be coaxially disposed about the rotor shaft. The system may further comprise an actuator coupled to the rotor shaft, the actuator configured to operate on a load based on a rotational position of the rotor shaft. The actuator may be configured to convert rotational motion of the rotor shaft into linear motion of the load.

In another embodiment, the system may be utilized in a particular manner such as the steps of selectively engaging a magnetic drive motor to rotate a rotor shaft at a first rotational speed and generate a first torque output therefrom; selectively engaging a capacitive drive motor to rotate a rotor shaft at a second rotational speed and generate a second torque output therefrom. In some embodiments, first rotational speed is greater than the second rotational speed and/or the second torque output is greater than the first torque output. The method may also include the step of converting the second torque output to operate a machine tool.

The machine tool may comprise one or more of welding, punching or forming a workpiece with the machine tool. Selectively engaging the magnetic drive motor may also comprise selectively disengaging the capacitive drive motor and selectively engaging the capacitive drive motor comprises selectively disengaging the magnetic drive motor. Selectively engaging the magnetic drive motor may also comprise managing a power output of the capacitive drive motor being driven by the rotor shaft. Selectively engaging the capacitive drive motor may also comprise managing a power output of the magnetic drive motor being driven by the rotor shaft. Managing a power output may also comprise maintaining a current output below threshold for one or both of the capacitive drive motor and the magnetic drive motor, respectively. The current threshold may be based on a wire gauge. The method may further comprise selecting the wire gauge to reduce a weight of the motor system while maintaining the first and second rotational speeds and the first and second torque outputs. Selectively engaging the magnetic drive motor may further comprise controlling the first rotational speed and the first torque output based substantially upon a current and a voltage applied to the magnetic drive motor, respectively. Selectively engaging the capacitive drive motor may comprise controlling the second rotational speed and the second torque output based substantially upon a voltage and a current applied to the capacitive drive motor, respectively.

In another embodiment, a motor system may be operated according to the method described in the aforementioned embodiment. The magnetic drive motor in this embodiment may be configured to rotate the rotor shaft at the first rotational speed at a lower operating current than the capacitive drive motor. The capacitive drive motor may be configured to generate the second output torque at a lower operating voltage than the magnetic drive motor. The motor controller may be configured to selectively engage and disengage the magnetic drive motor and the capacitive drive motor in order to rotate the rotor shaft at the first and second operational speed and generate the first and second output torques at the lower operating voltage.

One embodiment may comprise a rotor shaft; a magnetic drive motor rotationally coupleable to the rotor shaft; a capacitive drive motor rotationally coupleable to the rotor shaft; a motor controller configured for selectively engaging one or both of the magnetic drive motor and the capacitive drive motor with the rotor shaft, based on a desired rotational speed and torque output thereof; and an actuator coupled to the rotor shaft, the actuator configured operate on a load based on the rotational speed and torque output of the rotor shaft; a clutch configured to alternately engage the magnetic drive motor and the capacitive drive motor with the rotor shaft, based on the desired rotational speed and torque output. The magnetic drive motor and the capacitive drive motor may be coaxially arranged along a rotational axis of the rotor shaft, with the clutch positioned there between. The capacitive drive motor may be coaxially arranged along a rotational axis of the rotor shaft, and the magnetic drive motor may arranged with a rotational axis of the magnetic drive motor being parallel and offset with respect to the rotational axis of the rotor shaft. The motor controller may be configured to selectively engage the magnetic drive motor to rotate a rotor shaft at a first rotational speed and generate a first torque output, and to selectively engage the capacitive drive motor to rotate the rotor shaft at a second rotational speed and generate a second torque output. The first rotational speed may be greater than the second rotational speed and the second output torque may be greater than the first output torque. The magnetic drive motor may be configured to rotate the rotor shaft at the first rotational speed with a lower operating voltage than the capacitive drive motor. The capacitive drive motor may be configured to generate the second output torque at a lower operating voltage than the magnetic drive motor.

While this invention has been described with reference to exemplary embodiments, it will be understood by those skilled in the art that various changes can be made and equivalents may be substituted without departing from the spirit and scope thereof. Modifications may also be made to adapt the teachings of the invention to particular problems, technologies, materials, applications and materials, without departing from the essential scope thereof. Thus, the invention is not limited to the particular examples that are disclosed herein, but encompasses all embodiments falling within the scope of the appended claims.

The invention claimed is:

1. A motor actuator system comprising:
   a rotor shaft;
   a magnetic drive motor rotationally coupleable to the shaft;
   a capacitive drive motor rotationally coupleable to the shaft;
   an engagement system comprising a motor controller configured for selectively engaging and disengaging the magnetic drive motor and the capacitive drive motor with the rotor shaft, based on a desired rotational speed and torque output thereof; and
   an actuator coupled to the rotor shaft, wherein the actuator is configured to operate on a load based on converting rotational motion and torque output of the rotor shaft into linear motion of the load, the selectively engaged motor being rotationally coupled to drive the shaft;
   wherein the capacitive drive motor comprises a plurality of rotor capacitor components mounted along the rotor shaft and adjacent corresponding stator capacitor components disposed on a stator, the rotor shaft configured for rotation by capacitive coupling of the rotor capacitor components with the corresponding stator capacitor components.

2. The system of claim 1, wherein:
   the motor controller is configured to control the engagement system based on an operational algorithm comparing one or more of voltage, current, and loading for each of the magnetic drive motor and the capacitive drive motor to the rotational speed or torque output of the shaft.

3. The system of claim 2, wherein the operational algorithm compares one or more of the voltage and current for each of the magnetic drive motor and the capacitive drive motor to loading thresholds based on power input or power output to each of the magnetic drive motor and the capacitive drive motor.

4. The system of claim 3, wherein the loading thresholds comprise current thresholds based on a wire gauge for each of the magnetic drive motor and the capacitive drive motor and the motor controller is configured to disengage one or both of the motors when a corresponding current threshold is approached or exceeded.

5. The system of claim 1, wherein the engagement system is configured to selectively engage the magnetic drive motor to generate the rotational speed of the rotor shaft at a selected operating voltage of the magnetic drive motor, and to selectively disengage the capacitive drive motor at the rotational speed.

6. The system of claim 5, wherein the engagement system is configured to selectively engage the capacitive drive motor to generate the torque output of the rotor shaft at a selected operating voltage of the capacitive drive motor, and to selectively disengage the magnetic drive motor at the torque output.

7. The system of claim 1, wherein the engagement system comprises a clutch configured to selectively engage and disengage the magnetic drive motor and the capacitive drive motor based on the rotational speed and torque output of the rotor shaft.

8. The system of claim 7, wherein the actuator is configured to position the load and transfer force or torque thereto based on the rotational speed and torque output of the shaft.

9. The system of claim 8, wherein the load comprises one or more of a welding gun, a punch or machine tool, a spray gun or sprayer, a gripper or grasping device, a vacuum nozzle, and a grinder, polisher or deburring device.

10. The system of claim 1, wherein the engagement system comprises a clutch disposed between the magnetic drive motor coaxially arranged with the capacitive drive motor along a rotational axis of the shaft, the clutch configured to alternately engage one or the other of the magnetic drive motor and the capacitive drive motor along the rotational axis.

11. The system of claim 1, wherein the capacitive drive motor is coaxially disposed along a rotational axis of the rotor shaft and further comprising the magnetic drive motor disposed parallel to the rotational axis of the rotor shaft.

12. The motor actuator system of claim 1, wherein the rotor capacitor components are longitudinally arranged along an outer surface of the rotor, radially adjacent the corresponding stator capacitor components disposed on the stator.

13. The motor actuator system of claim 1, wherein the rotor capacitor components are arranged on radially or transversely extending disks mounted to an outer surface of the rotor and interleaved with the corresponding stator capacitor components arranged on radially or transversely extending disks mounted to a stator surface coupled to the housing and extending radially inward from the stator surface toward the rotor.

14. A method of operating a motor system comprising a capacitive drive motor rotationally coupleable to a rotor shaft, a motor controller configured for selectively engaging the capacitive drive motor with the rotor shaft based on a desired rotational speed and torque output thereof, and an actuator coupled to the rotor shaft, the actuator configured operate on a load based on the rotational speed and torque output of the rotor shaft, the method comprising:
  selectively engaging a magnetic drive motor to rotate the rotor shaft at a first rotational speed and generate a first torque output therefrom;
  selectively engaging the capacitive drive motor to rotate the rotor shaft at a second rotational speed and generate a second torque output therefrom; and
  converting the second torque output to operate a machine tool;
  wherein the capacitive drive motor comprises a plurality of rotor capacitor components mounted along the rotor and adjacent corresponding stator capacitor components disposed on the stator, the rotor configured for rotation by capacitive coupling of the rotor capacitor components with the corresponding stator capacitor components.

15. The method of claim 14, wherein the first rotational speed is greater than the second rotational speed and the second torque output is greater than the first torque output.

16. The method of claim 14, wherein operating the machine tool comprises welding or forming a workpiece.

17. The method of claim 14, wherein:
  selectively engaging the magnetic drive motor comprises selectively disengaging the capacitive drive motor and managing a power output of the capacitive drive motor being driven by the rotor shaft;
  selectively engaging the capacitive drive motor comprises selectively disengaging the magnetic drive motor and managing a power output of the magnetic drive motor being driven by the rotor shaft; and
  managing a power output comprises maintaining a current output below threshold for one or both of the capacitive drive motor and the magnetic drive motor.

18. The method of claim 17, wherein the current threshold is based on a wire gauge selected to maintain the first and second rotational speeds and the first and second torque outputs.

19. The method of claim 14, wherein selectively engaging the magnetic drive motor comprises controlling the first rotational speed and the first torque output based substantially upon a current and a voltage applied to the magnetic drive motor and selectively engaging the capacitive drive motor comprises controlling the second rotational speed and the second torque output based substantially upon a voltage and a current applied to the capacitive drive motor, respectively.

20. The method of claim 14, wherein:
  the magnetic drive motor is configured to rotate the rotor shaft at the first rotational speed at a lower operating current than the capacitive drive motor;
  the capacitive drive motor is configured to generate the second output torque at a lower operating voltage than the magnetic drive motor; and
  the motor controller selectively engages and disengages the magnetic drive motor and the capacitive drive motor to rotate the rotor shaft at the first rotational speed at the lower operating current and to generate the second output torque at the lower operating voltage.

21. An actuator system comprising:
  a rotor shaft;
  a capacitive drive motor rotationally coupleable to the rotor shaft;
  a motor controller configured for selectively engaging the capacitive drive motor with the rotor shaft, based on a desired rotational speed and torque output thereof; and
  an actuator coupled to the rotor shaft, the actuator configured operate on a load based on the rotational speed and torque output of the rotor shaft;
  wherein the capacitive drive motor comprises a plurality of rotor capacitor components mounted along the rotor and adjacent corresponding stator capacitor components disposed on the stator, the rotor configured for rotation by capacitive coupling of the rotor capacitor components with the corresponding stator capacitor components.

22. The actuator system of claim 21, further comprising a magnetic drive motor rotationally coupleable to the rotor shaft and a clutch configured to alternately engage the magnetic drive motor and the capacitive drive motor with the rotor shaft based on the desired rotational speed and torque output.

23. The actuator system of claim 21, wherein a magnetic drive motor and the capacitive drive motor are coaxially arranged along a rotational axis of the rotor shaft.

24. The actuator system of claim 21, wherein the capacitive drive motor is coaxially arranged along a rotational axis of the rotor shaft, and wherein a magnetic drive motor is arranged with a rotational axis of the magnetic drive motor being parallel and offset with respect to the rotational axis of the rotor shaft.

25. The actuator system of claim 21, wherein:
the motor controller is configured to selectively engage the magnetic drive motor to rotate the rotor shaft at a first rotational speed and generate a first torque output, and to selectively engage the capacitive drive motor to rotate the rotor shaft at a second rotational speed and generate a second torque output;
the first rotational speed is greater than the second rotational speed and the second output torque is greater than the first output torque;
the magnetic drive motor is configured to rotate the rotor shaft at the first rotational speed with a lower operating voltage than the capacitive drive motor; and
the capacitive drive motor is configured to generate the second output torque at a lower operating voltage than the magnetic drive motor.

26. The actuator system of claim 21, wherein the rotor capacitor components are longitudinally arranged along an outer surface of the rotor, radially adjacent the corresponding stator capacitor components disposed on the stator.

27. The actuator system of claim 21, wherein the rotor capacitor components are arranged on radially or transversely extending disks mounted to an outer surface of the rotor and interleaved with the corresponding stator capacitor components arranged on radially or transversely extending disks mounted to a stator surface coupled to the housing and extending radially inward from the stator surface toward the rotor.

* * * * *